Feb. 27, 1940.  J. J. GALLIGAN  2,191,910
RUBBER ARTICLE
Filed March 4, 1936
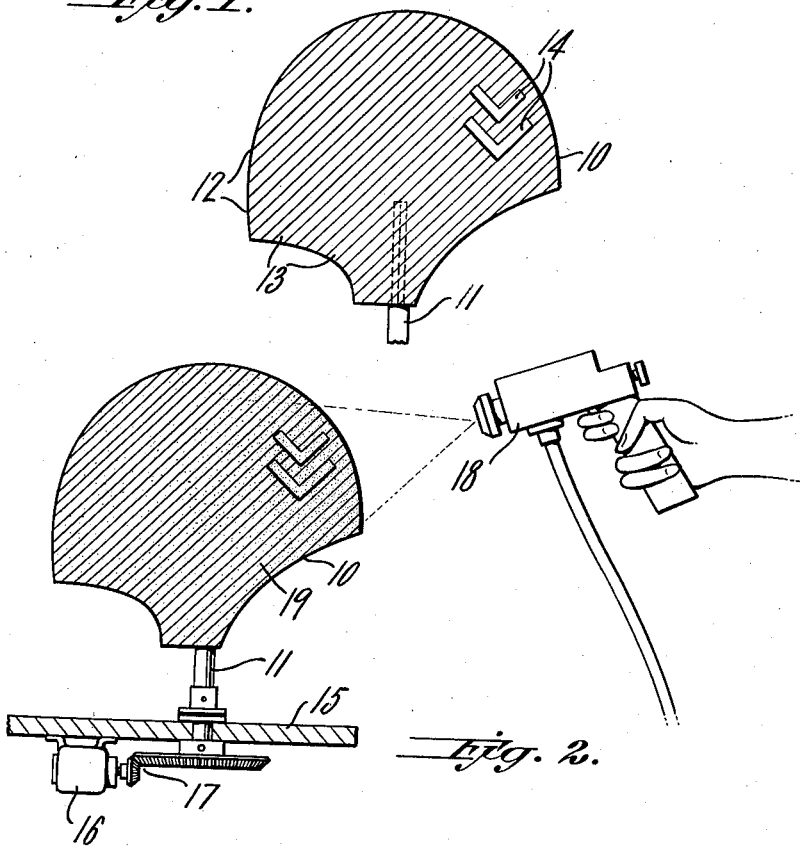
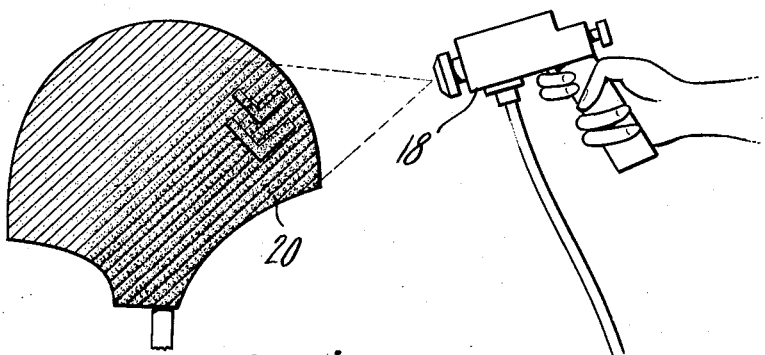
INVENTOR
JAMES J. GALLIGAN
BY
ATTORNEY.

Patented Feb. 27, 1940

2,191,910

UNITED STATES PATENT OFFICE 2,191,910

RUBBER ARTICLE

James J. Galligan, Providence, R. I., assignor, by mesne assignments, to United States Rubber Company, New York, N. Y., a corporation of New Jersey Application March 4, 1936, Serial No. 67,065

2 Claims. (Cl. 41—24)

This invention relates to rubber articles and method of making the same, and more particularly to rubber articles deposited from latex on a patterned deposition backing having raised and depressed portions on the surface thereof.

Rubber articles comprising sheet rubber material have been built up from latex on deposition forms having a patterned deposition surface with raised and depressed portions in the desired design by spraying, spreading, dipping or like operations. Deposition forms having the shape of the finished article, such as a rubber shoe or bathing cap are well known, as are also patterned belts for the formation of sheet stock from which parts of the finished article may be cut out and assembled in the usual manner of assembling sheet rubber articles. Invariably with such patterned surfaces, where it is desired to have an impervious rubber product, the surface of the rubber deposit not in contact with the deposition surface has been smooth and free from the pattern of the deposition surface. This is occasioned by the filling up of the depressed portions of the form and the smoothing over of the entire latex rubber surface when any appreciable thickness of deposit has been built up by spreading, dipping or spraying operations, as when a smooth film of latex is applied to the form and the latex coagulated by drying or by the application of a chemical coagulant, and the operations repeated until the desired thickness has been obtained. It is only the surface of the rubber layer that is detached from the deposition form which carries the pattern of the deposition surface. Where it is desired to produce an article having a decorated or patterned surface on both sides, it is necessary to impress a pattern on the exposed smooth rubber surface by means of a molding or like operation. Where a hollow article such as a bathing cap or article of footwear is to be produced, it is necessary to remove the rubber deposit from the deposition backing and turn it inside out before vulcanizing, if it is desired, as is invariably the case, to have the patterned surface on the outer or exposed surface of the finished article. It is substantially impossible to apply an impermeable coating of any appreciable thickness to a deposition backing and to have the outer coating of the rubber deposit follow the pattern contour of the deposition backing. Where it is desired to unite a film of rubber of appreciable thickness to a backing as in permanent coating operations and have the outer surface of the rubber patterned in a desired design, either the surface of the rubber coating must be molded after application to the permanent backing or the deposit must be made on a separate backing having the desired pattern in raised and depressed portions and the rubber deposit stripped from the deposition form and secured to the permanent backing by adhesives or the like.

The present invention relates to the manufacture of rubber articles of appreciable thickness from latex on patterned deposition backings so that the raised and depressed portions of the deposition surface will be reproduced on the exposed surface of the rubber deposit as well as on the surface of the deposit in contact with the deposition surface. The invention may be utilized in the manufacture of sheet rubber material or shaped articles comprising sheet rubber material having a pattern extending through the thickness of the sheet rubber material. The invention may further be utilized in permanently coating a form or base having a patterned surface with rubber from latex so that the exposed surface of the rubber coating carries the pattern of the deposition surface.

The invention will be described in connection with the accompanying drawing, in which:

Figure 1 illustrates a deposition form having a patterned surface with raised and depressed portions in the desired design;

Figure 2 illustrates one method of accomplishing the first step in producing a rubber deposit whose outer surface does not mask the pattern on the deposition backing; and Figure 3 illustrates the final steps of building up the rubber deposit to the desired thickness without masking the pattern on the deposition backing.

According to the present invention a thin continuous film of latex is first deposited on the patterned deposition backing so that the latex will deposit over the raised and depressed portions thereof without filling up the depressions. The film must be thin, otherwise the depressions will be filled up with the latex. This can readily be done by a dipping, spreading or spraying operation followed by chemical coagulation or drying in a known manner. This continuous film, if thin, will readily follow the contour of the deposition backing without filling in the depressions of the patterned surface and, if desired, several coats of latex may thus be applied to the patterned surface without masking the pattern. Care must be taken, however, that too much or a too thick latex is not used for the depth of the pattern on the deposition surface. Otherwise the depressed portions will be filled up as in the usual manner of making rubber articles of appreciable thickness. The thin continuous film of rubber deposited from latex and carrying the pattern of the deposition surface provides the base on which a pebbled or spongy deposit of latex may now be built up to the desired thickness without masking the pattern of the deposition backing. The thin continuous layer of latex deposit on the deposition surface may be electro-deposited on the surface, if desired, or may be formed by first applying a latex coagulant to the whole surface, or to the raised portions of the surface only, prior to applying the film of latex. When the thin continuous film of latex which is to be the base is applied to the deposition surface by spraying, the latex should be applied with a fine spray and the latex particles permitted to run together on the deposition surface to form a thin continuous film over the raised and depressed portions. Such spraying operation is the present preferred method of applying the thin continuous base layer of rubber, especially with small deposition backings, since the outer portion of the rubber deposit is built up thereafter to the desired thickness by a spraying operation as described below, and if the first latex deposit is applied by a spraying operation, then there is no necessity for changing the type of deposition operation in building up the deposit to the desired thickness.

After the continuous film of latex has been applied to the form, as by spraying, and is preferably coagulated by drying or chemical coagulation, the rubber deposit is built up to the desired thickness by spraying latex on to the continuous rubber film so that the sprayed latex particles become set and form a pebbled or spongy deposit as the film is built up without running together or filling in the depressions. Coarsening of the latex spray from the nozzle, increasing the viscosity and solids content of the latex, and increasing the speed of coagulation of the rubber particles in the spray, all tend to produce a pebbled or spongy deposit of individually set or coagulated latex particles. A latex spray may readily be controlled to produce a continuous deposit, as desired for the base film, or a discontinuous deposit ranging all the way from a pebbled to a very spongy type of surface, as desired for the outer film, by varying the viscosity or concentration of the latex, the coarseness of the spray, or by manipulating the nozzle itself or as by changing its distance from the deposition surface. The pebbled or spongy deposit may be obtained by rapidly coagulating or drying the particles before or just as they reach the deposition surface, and this may be accomplished by heating the deposition surface, or spraying through a heated gas, such as heated air, on to the deposition surface to produce rapid setting or drying, or by alternately spraying latex and a chemical coagulant in rapid succession so that the air surrounding the deposition form contains sufficient coagulant to coagulate the latex particles sprayed on to the deposition surface.

Referring more particularly to the drawing which illustrates but one embodiment of the invention, Fig. 1 shows a bathing cap form 10 which is mounted on a rotatable shaft 11 for rotation therewith. The form has a patterned surface as illustrated by the grooves 12 throughout the surface thereof which form the depressed portions of the pattern of the surface between the raised portions 13. A further design is illustrated at 14 where a small raised pattern is secured to the form proper. The forms may be of metal, glass, rubber, wood, clay synthetic resins and the like and may have their surfaces patterned by engraving or molding or by securing to otherwise patterned or smooth surfaces raised designs of the desired material.

In making an article according to the present invention on the form of Fig. 1, the same is mounted for rotation by means of rotatable shaft 11 on a support 15 and rotated at the desired speed by motor 16 through gears 17. It has been found satisfactory to rotate such a bathing cap form at about 46 revolutions per minute. As shown in Fig. 2, latex is applied from a spray gun 18 so that the latex particles run together to form a thin continuous film 19 over the raised and depressed portions of the form without filling up the depressions on the deposition surface. A fine spray and relatively slow coagulation of the latex on the surface of the form of drying or chemical coagulation will readily produce a continuous thin film of latex without filling up the depressed portions of the deposition surface. If too heavy a film of rubber is attempted to be deposited in the form of a continuous film however, the depressed portions will fill up and it is therefore necessary not to attempt to produce too thick a layer of rubber impervious to gases directly over the deposition surface. After a thin film of rubber has been deposited from latex on the deposition surface without filling in the depressed portions thereof, the rubber deposit may be built up to the desired thickness as shown at 20 by spraying the latex on to the continuous base film so that the sprayed particles become set and form a pebbled or spongy deposit as the film is built up without running together and filling up the depressions. As above stated, a rapid coagulation or drying of the latex particles during their travel from the spray gun 18 to the deposition surface, or a setting or coagulation just as they reach the surface will produce individual particles of set or coagulated rubber which adhere to the surface without running together, and depending on the size and number thereof produce a type of surface anywhere from a pebbled or mottled surface to a very coarse spongy deposit. The building up of these individually set or coagulated latex articles takes place of course equally on the depressed and raised portions of the thin continuous rubber deposit on the deposition surface and hence there is no running together of the particles or filling up the depressed portions as in common practice in spreading, dipping or spraying operation on the patterned surface as carired out today with a continuous film throughout the thickness of the deposit. The setting or coagulating of the latex particles prior to the time they reach the form or shortly thereafter to produce the adhering but non-running deposit may be accomplished by spraying with a coarse spray, or by heating the air through which the latex is sprayed, or by alternately spraying with a volatile coagulant which permeates the air surrounding the surface of the form and aids in coagulating the particles as they travel from the gun to the form. The same result may also to a great extent be accomplished by increasing the viscosity or solids content of the latex and it is often desirable to use a higher solids content and higher viscosity latex for the building up of the pebbled or spongy deposit than is used in producing the original thin continuous deposit on the deposition surface.

As a specific example, a bathing cap form of aluminum having a design on the surface, the average depth between the depressed and raised portions of which is approximately 1/64 inch and rotating at about 46 revolutions per minute was initially coated with a continuous rubber deposit by spraying a fine spray of latex of the following composition from a spray gun held approximately 12" from the form:

| | |
|---|---|
| Latex (60% solids) | 100 |
| Sulphur | 1.5 |
| Zinc oxide | 2.5 |
| Anti oxidant (symmetrical dibetanaphthyl paraphenylenediamine) | 0.25 |
| Accelerator (mercaptobenzothiazole) | 1.0 |
| Titanium oxide | 5.0 |

The continuous base film was built up to a thickness of about .004 inch by alternate spraying of the above latex composition and spraying a coagulant comprising a 25% aqueous acid solution. Thereafter the rubber surface was built up by means of a spongy deposit to an overall thickness of about .03 inch by spraying the same latex but with a much coarser spray and from a distance of 24" with alternate sprays of the 25% aqueous acetic acid coagulant. In this case the alternate sprays of coagulant were applied more frequently than when the continuous film was deposited in order to assure coagulation on the deposition surface without running together of the deposition particles to form a continuous film and filling up the depressions. The complete article was allowed to dry in the air and then vulcanized on the form in dry heat at about 240 C. for about 25 minutes, after which the cap was removed from the form. The cap, of course, can be removed from the form prior to vulcanization and turned inside out and placed on the same or another form as is necessary where the outer surface of the deposit on the form does not take the pattern of the deposition surface, as in present day practice, and the vulcanization made to take place in any of the various ways well known in the art.

The term "latex" in the description and claims is used to designate broadly the coagulable dispersions of elastic materials, including artificial dispersions of rubber or rubber-like materials as well as natural latex, which may be preserved or compounded or otherwise treated as desired and which may be in a normal, diluted, concentrated or purified condition produced by methods well known in the art.

With the above detailed disclosure of the invention it is evident that numerous modifications will suggest themselves to those skilled in the art, and it is not desired to limit the invention otherwise than as set forth in the appended claims.

Having thus described my invention, what I claim and desire to protect by Letters Patent is:

1. An article comprising a sheet of the direct deposit of solids of a latex composition and having a pattern extending through the thickness thereof so that raised and depressed portions forming the pattern are visible on each face of the rubber material, and at least one face of the rubber material having a pebbled surface comprising a multitude of individually coagulated latex particles in addition to the pattern formed by the raised and depressed portions.

2. An article comprising a sheet of the direct deposit of solids of a latex composition and having a pattern extending through the thickness thereof so that raised and depressed portions forming the pattern are visible on each face of the rubber material, one face of the rubber material being of relative smooth texture and the other face having a pebbled surface comprising a multitude of individually coagulated latex particles in addition to the pattern formed by the raised and depressed portions.

JAMES J. GALLIGAN.